United States Patent [19]

Hamano

[11] Patent Number: 4,519,261

[45] Date of Patent: May 28, 1985

[54] STARTING MOTOR WITH PLANETARY GEAR REDUCTION GEARS

[75] Inventor: Isao Hamano, Himeji, Japan

[73] Assignee: Mitsubishi Denki Kabushiki Kaisha, Japan

[21] Appl. No.: 437,612

[22] Filed: Oct. 29, 1982

[30] Foreign Application Priority Data

Nov. 17, 1981 [JP] Japan .......................... 56-171493[U]

[51] Int. Cl.[3] ......................... F02N 15/00; F16H 3/44

[52] U.S. Cl. ........................................ 74/7 E; 74/785; 74/801; 74/460

[58] Field of Search .................. 74/7 E, 460, 785, 801

[56] References Cited

U.S. PATENT DOCUMENTS

| | | | |
|---|---|---|---|
| 1,491,836 | 4/1924 | Whitney | 74/7 E |
| 2,481,783 | 9/1949 | Robinson et al. | 74/7 E X |
| 2,544,061 | 3/1951 | Barnett | 74/785 |
| 3,209,603 | 10/1965 | Rodriguez | 74/7 |
| 4,156,817 | 5/1979 | Preece et al. | 290/38 R |
| 4,346,615 | 8/1982 | Yoneda et al. | 74/7 E X |

FOREIGN PATENT DOCUMENTS

| | | | |
|---|---|---|---|
| 539401 | 4/1957 | Canada | 74/785 |
| 389258 | 3/1940 | Fed. Rep. of Germany | 74/785 |

*Primary Examiner*—Allan D. Herrmann
*Assistant Examiner*—Joseph M. Rolnicki
*Attorney, Agent, or Firm*—Leydig, Voit, Osann, Mayer and Holt, Ltd.

[57] ABSTRACT

This invention relates to a starting motor with planetary gear reduction gears having a spur gear provided at the front end of the rotational shaft of the starting motor, an internal gear secured fixedly to the front end of the yoke of the motor, a planetary gear for engaging the spur gear with the internal gear, an output rotational shaft for transmitting the rotary force of the motor to the planetary gear, and a pair of collars provided on the internal gear at both ends of the teeth of the internal gear.

1 Claim, 3 Drawing Figures

STARTING MOTOR WITH PLANETARY GEAR REDUCTION GEARS

BACKGROUND OF THE INVENTION

This invention relates to an improvement in a starting motor wherein planetary gear reduction gears are associated.

Heretofore, a starting motor of this type is constructed as shown in FIG. 1. As evident from FIG. 1, a D.C. motor 1 is a mounted on a front bracket 2, and this motor 1 has an armature 3. An armature rotational shaft 4 which extends from the armature 3 forms a spur gear section 5 which operates as a sun gear on the outer peripheral surface of the front end thereof. A planetary gear 6 is engaged in mesh with and is disposed around the spur gear section 5. The planetary gear 6 is further engaged in mesh with a ring-shaped internal gear 7 which is disposed outside the planetary gear 6, thereby forming a planetary motion mechanism. The internal gear 7 is mounted on the inner peripheral surface of a yoke 8 of the D.C. motor 1 together with an intermediate bracket 9. A sleeve bearing 10 is attached to an annular space between the axial flange inside the bracket 9 (at the side of the rotational shaft 4) and the armature rotational shaft 4, thereby bearing the armature rotational shaft 4.

A supporting pin 11 which operates as an arm is rotatably mounted at the center of the respective planetary gears 6 through a bearing 14. The end of the pin 11 is fixedly secured to a clutch outer 13 as an arm wheel. This clutch outer 13 is a part component of an overrunning clutch 12 and a cam 16 is arranged on the inner peripheral surface thereof. A wedge-shaped space is formed between a clutch inner 15 which is disposed concentrically with the clutch outer 13 and the cam 16. The rotary force of the clutch outer 13 is transmitted only with respect to the unidirectional rotation to the clutch inner 15 by means of the intrusion of a rotor 17 arranged in the wedge-shaped space into the narrow direction of the rotor 17.

The clutch inner 15 is secured fixedly to an output rotational shaft 18 which is disposed on the same axis as the axis of the armature rotational shaft 4. A helical spline 19 is formed on the outer peripheral surface of the rotational shaft 18. A pinion 20 is engaged with the rotational shaft 18, and this pinion 20 is engaged with the helical spline 19. This pinion 20 is formed so that, when the rotational shaft 18 is rotated, the pinion 20 slides forwardly and hence rightwardly in FIG. 1.

The armature rotational shaft 4 extends at the front end thereof toward the central recess formed on the side surface of the clutch inner 15. A sleeve bearing 21 is mounted between the inner peripheral surface of the central recess of the clutch inner 15 and the outer peripheral surface of the front end of the rotational shaft 4, thereby supporting each other. On the other hand, a sleeve bearing 22 is engaged with the inner peripheral surface at the front end of the front bracket 2, thereby bearing and supporting the front end of the output rotational shaft 18. There are also provided a stopper 23 which stops the forward movement of the pinion and a thrust washer 24 which bears the thrust stress generated mainly at this time on the outer peripheral surface at the front end of the rotational shaft 18.

A washer 25 is engaged with the outer rear peripheral surface of the sleeve section of the pinion 20, and the engaging groove of a shifting lever 26 is formed on the periphery of the sleeve section in cooperation with the teeth side surface of the pinion 20. This shifting lever 26 is engaged with the cam at the lever section 26*b* above the pivotal center of the shifting lever 26. This cam is formed at the front end of a plunger 28 of an electromagnetic switch 27 which is mounted on the front bracket 2. In this manner, the lower lever section 26*a* of the shifting lever 26 is rotatably energized counterclockwise in FIG. 1 by the operation of the switch 27.

The operation of the conventional starting motor with the planetary gear reduction gears thus constructed will be described hereinafter.

The pinion 20 is forwardly shifted on the helical spline 19 of the output rotational shaft 18 by the energization of the electromagnetic switch 27, and is thus engaged in mesh with a ring gear (not shown) of an internal combustion engine (not shown). When the main contact (not shown) of the switch 27 is then closed and the armature 3 is energized, rotary force is generated. Thus, the planetary gear 6 is driven through the spur gear section 5 on the armataure rotational shaft 4. The rotating speed of the armature 3 is internally decelerated and is transmitted to the overrunning clutch 12. As a result, the output rotational shaft 18 is rotated in one direction through the clutch, and the pinion 20 is thereby rotated to drive the ring gear of the internal cumbustion engine, thereby starting the internal combustion engine.

Since the conventional starting motor with the planetary gear reduction gears thus constructed is, however, engaged at the pinion in mesh with the internal combustion engine which is stopped immediately before the armature is energized at the starting time, high stress is generated at the reduction gears at the time of energizing the armature. Since the reduction gears are further rotated without load after the engine is started and are thus rotated at a high speed, the reduction gears have drawbacks such as the wearing out of the reduction gears in a short time, etc.

SUMMARY OF THE INVENTION

An object of this invention is to provide a starting motor with planetary gear reduction gears in which the disadvantages mentioned above of the conventional starting motor are eliminated, the production of high stress at the starting time is prevented and the wear of the planetary gear reduction gear due to the high speed rotation of the motor after an internal combustion engine is started is prevented.

BRIEF DESCRIPTION OF THE DRAWINGS

In the Figures, the same numerals designate the same or equivalent parts and components.

DESCRIPTION OF THE PREFERRED EMBODIMENTS

Figure 2:
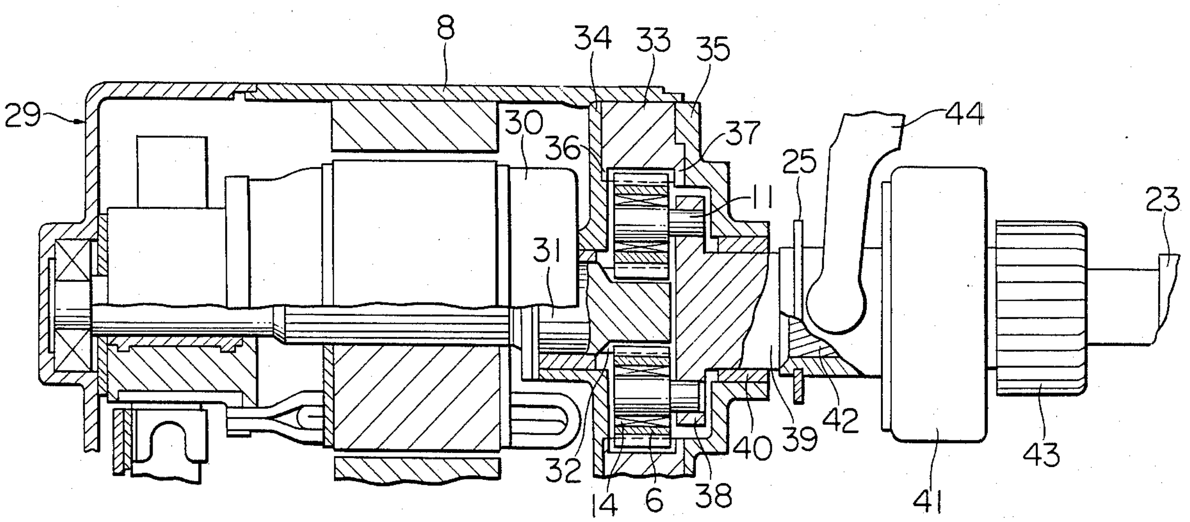
FIG. 2 is a partly fragmentary front sectional view showing an embodiment of a starting motor with planetary gear reduction gears according to this invention.
Figure 3:
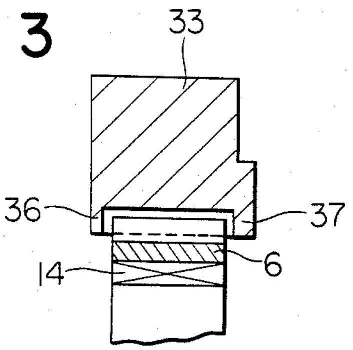
FIG. 3 is an explanatory view showing the enlarged collar of an internal gear.

Now, an embodiment of this invention will be described with reference to the drawings. In FIG. 2, an embodiment of the starting motor with planetary gear reduction gears of this invention is shown. The starting motor with planetary gear reduction gears of this embodiment comprises a D.C. motor 29 which is energized to rotate an armature rotational shaft 31 which is mounted in an armature 30 of the motor 29. A spur gear section 32 which is formed at the front end of the rotational shaft 31 operates as a sun gear, and a planetary gear 6 is engaged in mesh with the periphery of the spur gear section 32. The planetary gear 6 is engaged in mesh with a ring-shaped internal gear 33 which is engaged together with first and second intermediate brackets 34, 35 with the inner peripheral surface of a yoke 8 of the motor 1 in the same manner as the conventional starting motor. This internal gear 33 is formed integrally with collars 36, 37 at both ends of the teeth section thereof. FIG. 3 shows the construction of the collars 36 and 37. Referring to FIGS. 2 and 3, an arm 11 is rotatably mounted on the center of the planetary gear 6 through a bearing 14, and the end of the arm 11 is mounted on an arm wheel 38.

The arm wheel 38 is secured fixedly to an output rotational shaft 39, which is beared by a sleeve bearing 40 mounted on the second intermediate bracket 35 at the rear side. The front end of the rotational shaft 39 is beared by the sleeve bearing 40 in the same manner as the case of the conventional starting motor shown in FIG. 1. An overrunning clutch 41 is engaged in spline engagement with a helical spline 42 formed on the outer peripheral surface of the shaft 39. A pinion 43 which is movably engaged with the rotational shaft 39 is secured fixedly to the front end of the overrunning clutch 41. A washer 25 is mounted on the outer rear periphery of the sleeve section of the overrunning clutch 41, thereby forming the engaging groove of a shifting lever 44 in cooperation with the side wall of the clutch section. Therefore, the overrunning clutch 41 slides on the rotational shaft 39 together with the pinion 43 by the operation of the shifting lever 44. In this manner, the pinion 43 can be engaged in mesh with a ring gear (not shown) of an internal combustion engine (not shown).

Figure 1:
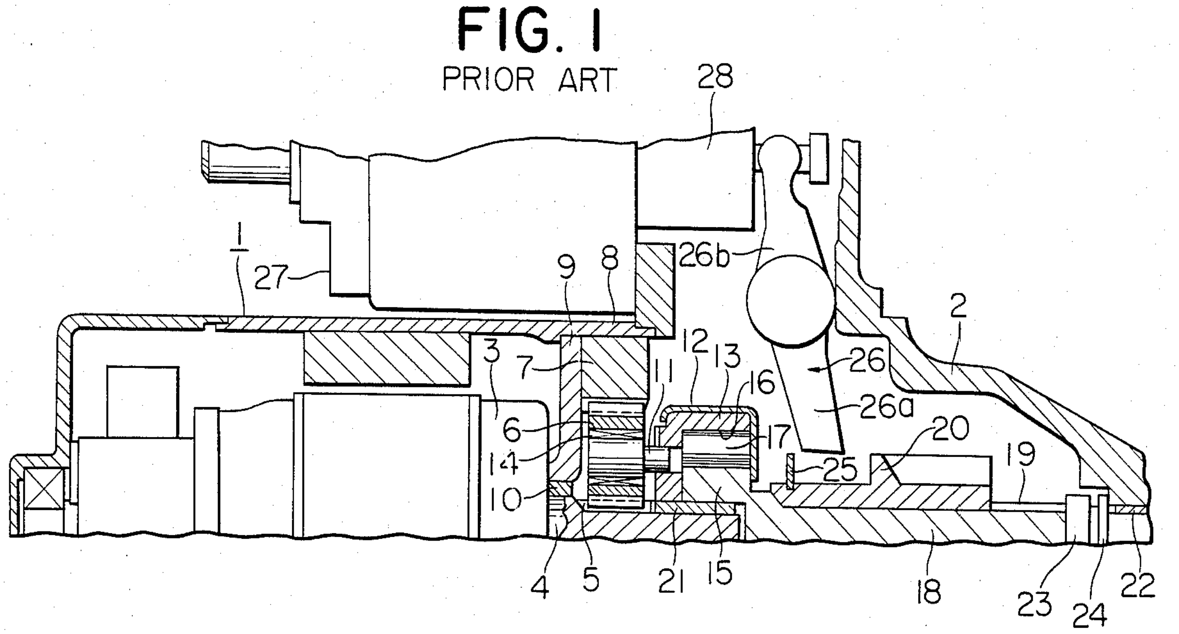
FIG. 1 PRIOR ART
FIG. 1 is a partly fragmentary front sectional view of a conventional starting motor with planetary gear reduction gears.

Since the construction of the parts not described above are substantially the same as their respective parts of the conventional starting motor shown in FIG. 1, their description will be omitted.

According to the starting motor with the planetary gear reduction gears thus constructed and operated according to this invention, the internal gear 33 which bears the engaging reaction of the planetary gear 6 is connected at the peripheral edges at both ends of the teeth section between the adjacent gears through the collars 36 and 37 and accordingly the strength of the teeth section can be enhanced. Further, lubricating oil at the teeth section can be prevented from being scattered by the collars 36 and 37, thereby obtaining a stable lubricating function of the teeth section for a long period of time.

As described above, according to this invention, the internal gear which forms the planetary gear reduction gear is constructed with the collars at both ends. Therefore, reduction gears having extremely high strength and a lubricant holding function can be simply constructed.

What is claimed is:

1. A starting motor with planetary gear reduction gears comprising a spur gear provided at a front end of a rotational shaft of said starting motor, a ring shaped gear having internal gear teeth fixed to a front end of a yoke of said motor, a planetary gear for engaging said spur gear with said ring shaped gear, an output rotational shaft for transmitting the rotary force of said motor through said planetary gear, and a pair of collars integral with said ring shaped gear and both ends of the internal teeth of said ring shaped gear.

* * * * *